United States Patent
Hiratsuka

(10) Patent No.: US 10,298,788 B2
(45) Date of Patent: May 21, 2019

(54) IMAGE FORMING APPARATUS THAT ENSURES TRIAL PRINTING AND RECORDING MEDIUM THEREFOR

(71) Applicant: KYOCERA Document Solutions Inc., Osaka (JP)

(72) Inventor: Motoki Hiratsuka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/807,392

(22) Filed: Nov. 8, 2017

(65) Prior Publication Data
US 2018/0159995 A1   Jun. 7, 2018

(30) Foreign Application Priority Data

Dec. 2, 2016 (JP) ................................. 2016-234640

(51) Int. Cl.
*H04N 1/00* (2006.01)
*H04N 1/60* (2006.01)

(52) U.S. Cl.
CPC ..... *H04N 1/00482* (2013.01); *H04N 1/00485* (2013.01); *H04N 2201/0091* (2013.01); *H04N 2201/3232* (2013.01)

(58) Field of Classification Search
None
See application file for complete search history.

(56) References Cited

U.S. PATENT DOCUMENTS

| | | | | |
|---|---|---|---|---|
| 8,587,819 B2* | 11/2013 | Chida | ................... | G03G 15/36 358/1.18 |
| 9,766,847 B1* | 9/2017 | Alacar | .................. | G06F 3/1289 |
| 2002/0006291 A1* | 1/2002 | Kuboki | ............. | H04N 1/00013 399/82 |
| 2004/0114155 A1* | 6/2004 | Kurahashi | .......... | H04N 1/00567 358/1.1 |
| 2004/0139389 A1* | 7/2004 | Sato | ........................ | G06F 17/24 715/255 |
| 2004/0190057 A1* | 9/2004 | Takahashi | ............. | G06F 3/1205 358/1.15 |
| 2005/0094208 A1* | 5/2005 | Mori | ..................... | G06F 17/211 358/1.18 |

(Continued)

FOREIGN PATENT DOCUMENTS

JP          2004-015475 A     1/2004

*Primary Examiner* — Anh-Vinh T Nguyen
(74) *Attorney, Agent, or Firm* — Stein IP, LLC

(57) ABSTRACT

An image forming apparatus includes an image obtaining unit, a copy number obtaining unit, a set value obtaining unit, a set value applying unit, and a print performing unit. When the set value obtaining unit obtains and stores a plurality of different set values, the set value applying unit applies the plurality of respective set values to the image obtained by the image obtaining unit to generate and store a plurality of different set value applied images, and the specific count of copies of the plurality of respective set value applied images are printed, the print performing unit printing any one set value applied image among the plurality of stored set value applied images. A count of copies of the printing of the one set value applied image is found by subtracting the specific count of copies from the count of print copies.

4 Claims, 4 Drawing Sheets

(56) References Cited

U.S. PATENT DOCUMENTS

| | | | | |
|---|---|---|---|---|
| 2005/0105129 A1* | 5/2005 | Takahashi | .......... | H04N 1/00204 358/1.15 |
| 2006/0066907 A1* | 3/2006 | Nakata | ................. | G03G 21/043 358/3.1 |
| 2006/0221358 A1* | 10/2006 | Takahashi | .......... | H04N 1/00432 358/1.1 |
| 2007/0188791 A1* | 8/2007 | Utsunomiya | ...... | H04N 1/00411 358/1.13 |
| 2008/0130037 A1* | 6/2008 | Tamayo | ................. | G06K 15/02 358/1.15 |
| 2008/0180703 A1* | 7/2008 | Yamada | ................ | G06F 3/1204 358/1.9 |
| 2008/0304768 A1* | 12/2008 | Yamashita | ........... | H04N 1/00408 382/298 |
| 2009/0059258 A1* | 3/2009 | Hikosaka | ........... | H04N 1/00002 358/1.9 |
| 2009/0265625 A1* | 10/2009 | Tamai | ................ | H04N 1/00408 715/274 |
| 2010/0027040 A1* | 2/2010 | Kuroda | ............. | G03G 15/0173 358/1.9 |
| 2010/0131566 A1* | 5/2010 | Sato | ........................ | G06F 17/21 707/802 |
| 2011/0242561 A1* | 10/2011 | Nitta | ................... | G06F 3/04886 358/1.9 |
| 2012/0113462 A1* | 5/2012 | Mihira | ................. | G06F 3/1208 358/1.15 |
| 2015/0294204 A1* | 10/2015 | Kishi | ................... | G06K 15/027 358/1.9 |
| 2016/0019015 A1* | 1/2016 | Hirasawa | ............. | G06F 3/1205 358/2.1 |
| 2016/0350629 A1* | 12/2016 | Dozen | ................ | G06K 15/1807 |
| 2017/0060064 A1* | 3/2017 | Nakatsuji | ........... | G03G 15/5058 |

\* cited by examiner

IMAGE FORMING APPARATUS THAT ENSURES TRIAL PRINTING AND RECORDING MEDIUM THEREFOR

INCORPORATION BY REFERENCE

This application is based upon, and claims the benefit of priority from, corresponding Japanese Patent Application No. 2016-234640 filed in the Japan Patent Office on Dec. 2, 2016, the entire contents of which are incorporated herein by reference.

BACKGROUND

Unless otherwise indicated herein, the description in this section is not prior art to the claims in this application and is not admitted to be prior art by inclusion in this section.

There is known a typical image forming apparatus that prints one copy of images (what is called, trial printing) and then ensures printing the remaining number of copies of the images after a user visually checks the printed images and changes a setting.

SUMMARY

An image forming apparatus according to one aspect of the disclosure includes an image obtaining unit, a copy number obtaining unit, a set value obtaining unit, a set value applying unit, and a print performing unit. The image obtaining unit obtains and stores an image of a print target. The copy number obtaining unit obtains a count of print copies of the image. The set value obtaining unit obtains and stores a set value that is applied to the image. The set value applying unit applies the set value to the image obtained by the image obtaining unit to generate and store a set value applied image. The print performing unit prints a specific count of copies of the set value applied image, when the set value obtaining unit obtains and stores a plurality of different set values, the set value applying unit applies the plurality of respective set values to the image obtained by the image obtaining unit to generate and store a plurality of different set value applied images, and the specific count of copies of the plurality of respective set value applied images are printed, the print performing unit printing any one set value applied image among the plurality of stored set value applied images. A count of copies of the printing of the one set value applied image is found by subtracting the specific count of copies from the count of print copies.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
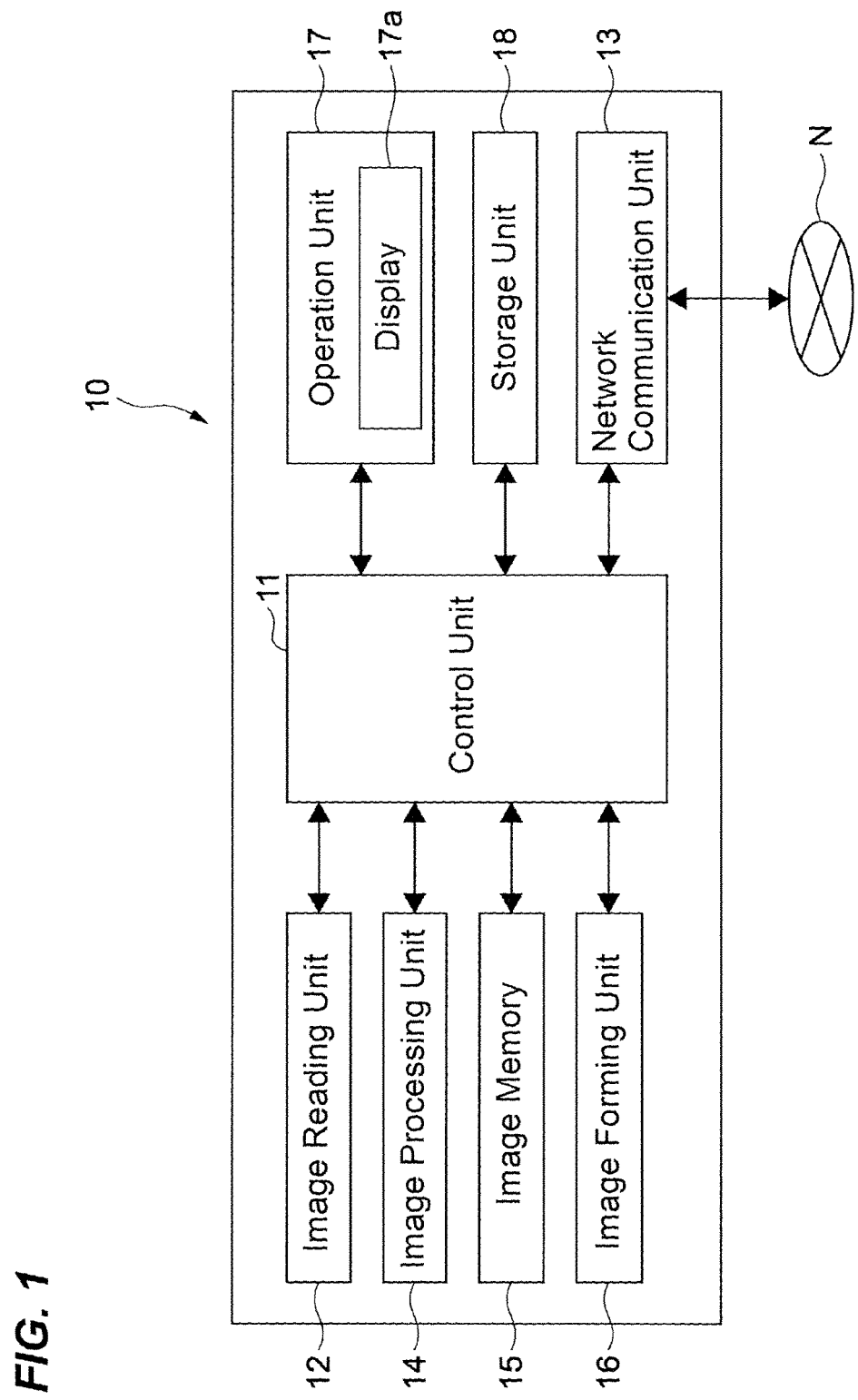
FIG. 1 illustrates a hardware configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

1. Hardware Configuration of Image Forming Apparatus 10

FIG. 1 illustrates a hardware configuration of an image forming apparatus 10 according to one embodiment of the disclosure.

The image forming apparatus 10 is typically a Multifunction Peripheral (MFP) and is hereinafter simply referred to as an MFP 10.

The MFP 10 includes a control unit 11. The control unit 11 is constituted of, for example, a Central Processing Unit (CPU), a Random Access Memory (RAM), a Read Only Memory (ROM), and a dedicated hardware circuit, and manages the whole operation control of the MFP 10. Computer programs that cause the MFP 10 to function as respective functional units (described later) are stored in a non-transitory computer-readable storage medium such as the ROM.

The control unit 11 is connected to, for example, an image reading unit 12, an image processing unit 14, an image memory 15, an image forming unit 16, an operation unit 17, a storage unit 18, and a network communication unit 13. The control unit 11 performs an operation control of the connected respective units and transmits and receives signals or data to/from the respective units.

The control unit 11 controls driving and processes of mechanisms that are necessary to perform operation controls for respective functions, such as a scanner function, a printing function, and a copy function, based on an execution instruction on the job input via, for example, the operation unit 17 or a personal computer (not illustrated) connected to the network from a user.

The image reading unit 12 reads images from an original document.

The image processing unit 14 performs image processing on image data of the images read by the image reading unit 12 as necessary. For example, the image processing unit 14 performs the image processing, such as shading correction, to improve the quality of the images read by the image reading unit 12 after the image formation.

The image memory 15 has a region where the image memory 15 temporarily stores data of document images obtained by reading by the image reading unit 12, and data as a print target to be printed by the image forming unit 16.

The image forming unit 16 performs image formation of the image data read by the image reading unit 12 or similar image data.

The operation unit 17 includes a touch panel unit and an operation key unit, which accept instruction of various operations and processing executable for the MFP 10 from a user. The touch panel unit includes a display 17a, such as a Liquid Crystal Display (LCD) including a touch panel.

The network communication unit 13 is an interface for connecting to the network.

The storage unit 18, which stores the document images read by the image reading unit 12 and similar data, is a large-capacity storage device such as a Hard Disk Drive (HDD).

2. Functional Configuration of Image Forming Apparatus 10

Figure 2:
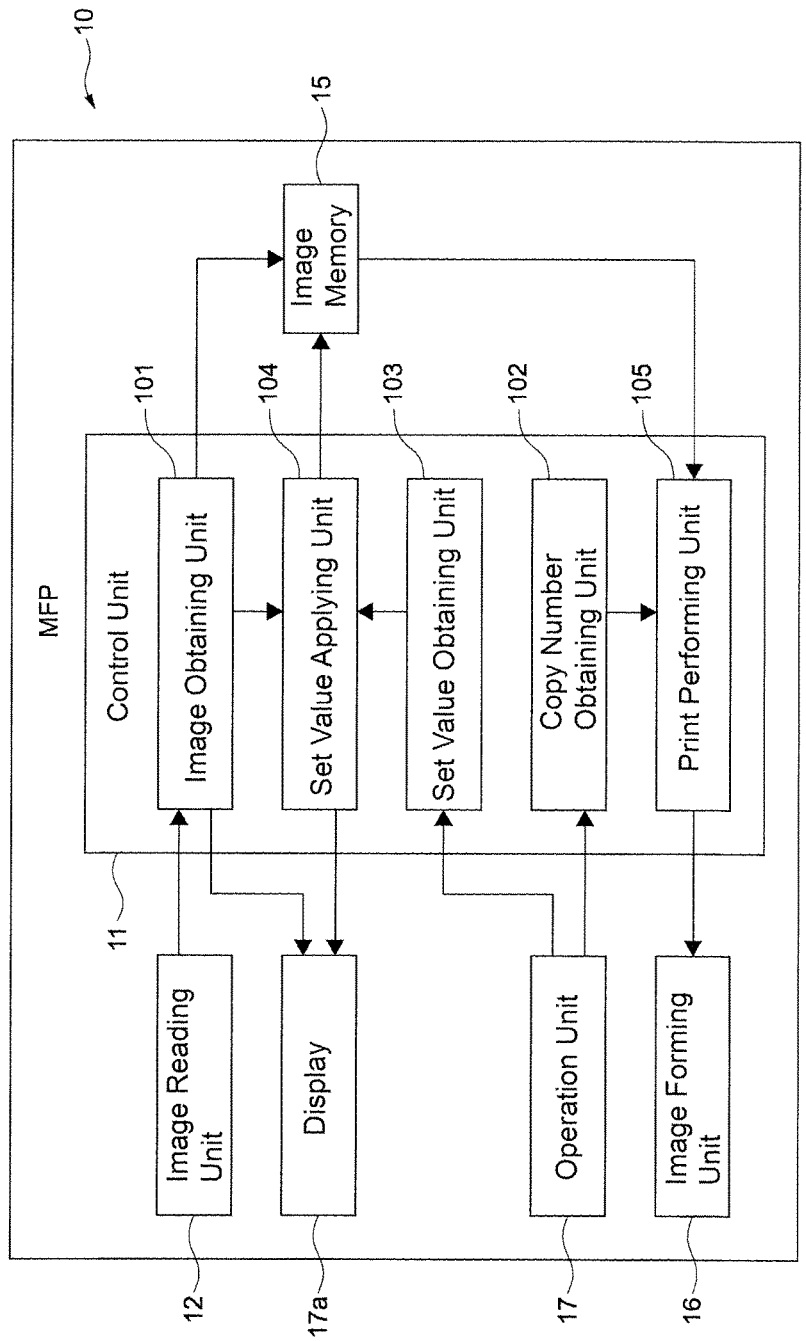
FIG. 2 illustrates a functional configuration of the image forming apparatus according to the one embodiment.

FIG. 2 illustrates a functional configuration of the image forming apparatus 10.

The MFP 10 loads an information processing program stored in the ROM, which is an example of a non-transitory computer-readable storage medium, into the RAM to execute it, so as to function as an image obtaining unit 101, a copy number obtaining unit 102, a set value obtaining unit 103, a set value applying unit 104, and a print performing unit 105.

The image obtaining unit 101 obtains the images (one or more pages) of the print target read by the image reading unit 12 and stores the obtained images (original image) in the image memory 15.

The copy number obtaining unit 102 obtains the number of print copies (the number of copies) of the images based of a specific operation for the operation unit 17 from the user.

The set value obtaining unit 103 obtains a set value that is applied to the images based of the specific operation for the operation unit 17 from the user.

The set value applying unit 104 applies the set value, which the set value obtaining unit 103 has obtained, to the original image, which the image obtaining unit 101 has obtained, to generate a set value applied image, and then stores it in the image memory 15.

The print performing unit 105 outputs the original image, which the image obtaining unit 101 has obtained, and the set value applied image, which the set value applying unit 104 has generated, to the image forming unit 16 to print them.

3. Operational Flow of Image Forming Apparatus 10

Figure 3:
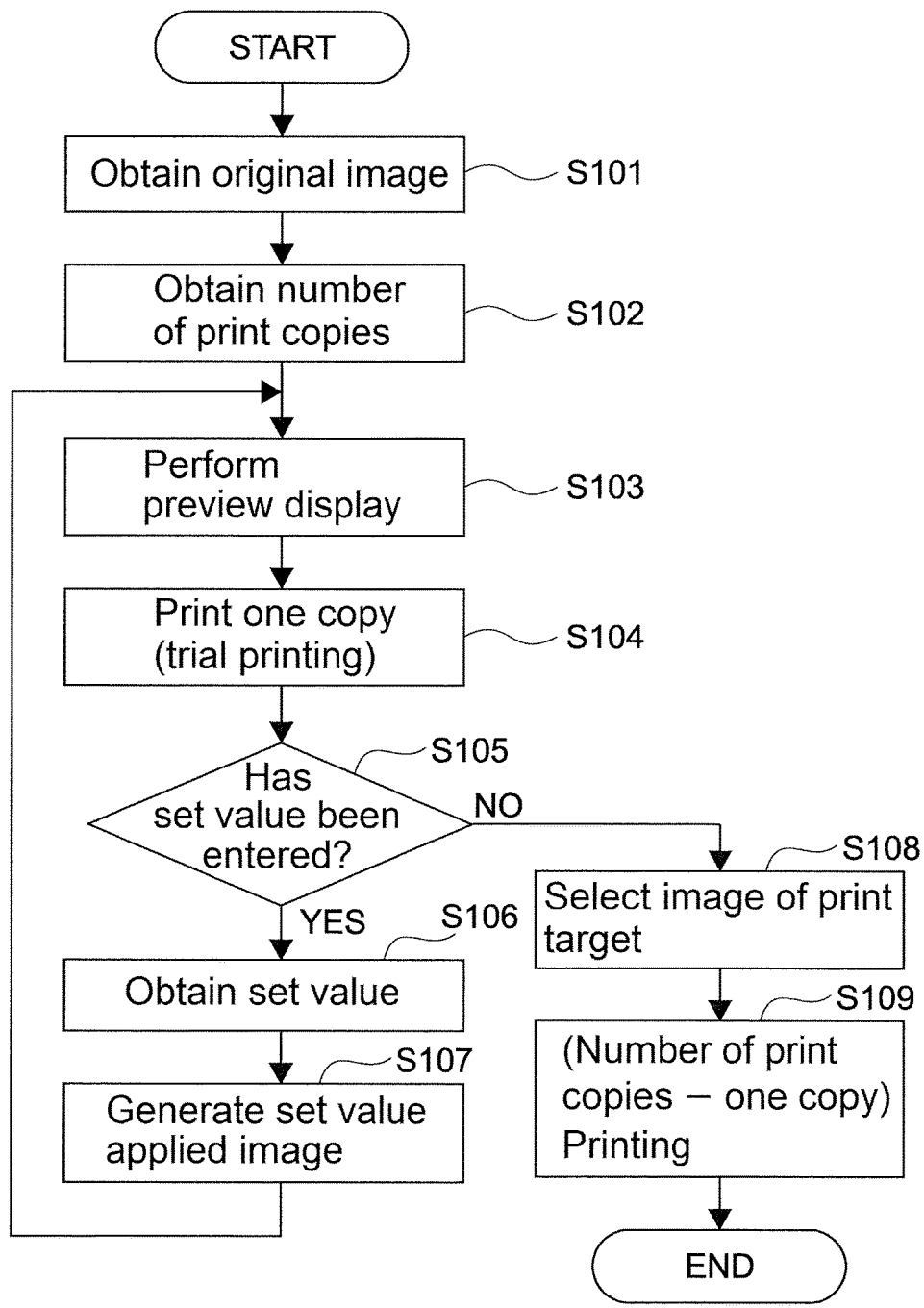
FIG. 3 illustrates an operational flow of the image forming apparatus according to the one embodiment.

FIG. 3 illustrates an operational flow of the image forming apparatus 10.

The image reading unit 12 reads (scans) the images of the print target from the original document (one or more sheet), which the user has placed on the image reading unit 12. At this time, the image reading unit 12 reads the original document at, for example, the highest resolution, full color, identical magnification, and the highest image quality that are available for the image reading unit 12. The image obtaining unit 101 obtains the images (one or more page) of the print target read by the image reading unit 12. The image obtaining unit 101 stores the obtained images (original images) in the image memory 15 (Step S101).

On the other hand, the copy number obtaining unit 102 obtains the number of print copies (the number of copies) of the images based of the specific operation for the operation unit 17 from the user (Step S102). Assume that the number of print copies means multiple copies in the embodiment.

On the other hand, the image obtaining unit 101 performs a preview display of the obtained original images on the display 17a (Step S103). The preview display of the original images may be performed in response to needs of the user and may be skipped.

The print performing unit 105 outputs the original image, which the image obtaining unit 101 has obtained, to the image forming unit 16 to print one copy (one example of the specific number of copies) thereof (trial printing of the first trial) (Step S104).

The user visually checks the one copy of the printed original image. When being satisfied with the printing result, the user operates the operation unit 17 such that the remaining number of copies of the original images are printed (NO at Step S105). The print performing unit 105 selects the original images as the images of the print target based of the specific operation for the operation unit 17 from the user (Step S108). The print performing unit 105 prints the number of copies found by subtracting one copy from the number of print copies obtained by the copy number obtaining unit 102 (Step S109).

On the other hand, when being not satisfied with the printing result (a trial printing result of the first trial), the user operates the operation unit 17 to enter a set value (YES at Step S105).

The set value obtaining unit 103 displays a thumbnail of the original image, which the image obtaining unit 101 has obtained, on the display 17a. The set value obtaining unit 103 obtains a set value that is applied to the images based of the specific operation for the operation unit 17 from the user. The set value obtaining unit 103 stores the obtained set value in a memory (Step S106). Concrete examples of the "set value" include, for example, magnification (% of enlargement/reduction), color (full color/black and white), image quality (for example, hue and color tone), staple (with/without), and sort (with/without). Another concrete example of the "set value" includes a removal of at least one page among images of a plurality of pages, such as a removal of the second page among images of three pages. The "set value" is a group of such variable values.

At Step S106 of the second trial, the set value obtaining unit 103 can obtain a replacement of at least one page among set value applied images with an identical page of the original images (the images of the first trial) as the set value. For example, the set value obtaining unit 103 can obtain a replacement of the second page of the set value applied images of the second trial with the second page of the original images (the images of the first trial) as the set value.

The set value applying unit 104 applies the set value obtained by the set value obtaining unit 103 to the original images obtained by the image obtaining unit 101 to generate the set value applied image. The set value applying unit 104 stores the generated set value applied images in the image memory 15 (Step S107). The set value applying unit 104 performs a preview display of the generated set value applied images on the display 17a (Step S103). The preview display of the set value applied images may be performed in response to needs of the user, and the preview display may be skipped.

The print performing unit 105 outputs the set value applied images generated by the set value applying unit 104 to the image forming unit 16 to print one copy thereof (trial printing of the second trial) (Step S104).

The user visually checks the one copy of the printed set value applied image. When being satisfied with the printing result, the user operates the operation unit 17 such that the remaining number of copies of the set value applied images are printed (NO at Step S105). The print performing unit 105 selects the original images or the set value applied images as the images of the print target based of the specific operation for the operation unit 17 from the user (Step S108). The print performing unit 105 prints the number of copies found by subtracting one copy from the number of print copies obtained by the copy number obtaining unit 102 (Step S109).

On the other hand, when being not satisfied with the printing result (a trial printing result of the second trial), the user operates the operation unit 17 to enter a different set value (YES at Step S105). This causes the MFP 10 to execute Step S106 and subsequent operations again (at the third and subsequent trials).

At Step S106 at the third and subsequent trials, the set value obtaining unit 103 obtains a set value (a set value different from the set values of the previous trials) that is applied to the images based of the specific operation for the operation unit 17 from the user. At the third and subsequent trials, the set value obtaining unit 103 can obtain a replacement of at least one page among set value applied images with an identical page of the original images (the images of the first trial) or the set value applied images (the images of the second or another trial) to which a different set value is applied as the set value. For example, the set value obtaining unit 103 can obtain a replacement of the second page of the set value applied images of the third trial with the second page of the original images (the images of the first trial) as the set value. Alternatively, the set value obtaining unit 103 can obtain a replacement of the second page of the set value applied images of the third trial with the second page of the set value applied images of the second trial as the set value.

The following describes a method for achieving replacement of images of a different trial.

Figure 4:
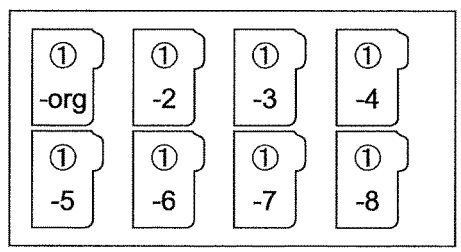
FIG. 4 illustrates a concrete example of thumbnails displayed at the second and subsequent trials.
Figure 5:
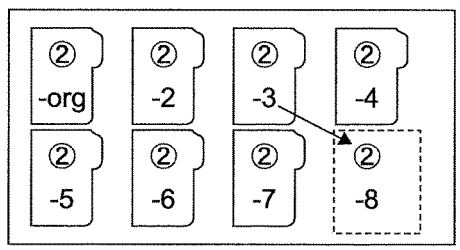
FIG. 5 illustrates a concrete example of thumbnails displayed at the second and subsequent trials.

FIGS. 4 and 5 illustrate concrete examples of thumbnails to be displayed at the second and subsequent trials. At the second and subsequent trials, at Step S106, which has been described above, the set value obtaining unit 103 displays thumbnails of images (the original images and different set value applied images whose number of pieces is found by subtracting one from the number of trials) whose the number of pieces is the number of trials on the display 17a. The following describes one example of thumbnails displayed at an eighth trial.

As illustrated in FIG. 4, a thumbnail "-org" of the first page (indicated by "circled 1" in FIG. 4) of the original images (the images of the first trial) and thumbnails "-2" to "-8" of the first page of the set value applied images of the second to eighth trials are displayed on the display 17a.

As illustrated in FIG. 5, for example, selecting a tab (not illustrated) displayed on the display 17a displays a thumbnail "-org" of the second page (indicated by "circled 2" in FIG. 5) of the original images (the images of the first trial) and thumbnails "-2" to "-8" of the second page of the set value applied images of the second to eighth trials on the display 17a. When the second page of the set value applied images of the eighth trial has been removed, the thumbnail "-8" of the second page of the set value applied images of the eighth trial is displayed using a dotted line or a grayed out image. Performing an operation of dragging the thumbnail "-3" of the second page to the position of the thumbnail "-8" of the second page via the operation unit 17 can replace the removed set value applied images of the second page of the eighth trial with the set value applied images of the second page of another trial (for example, the third trial).

Figure 6:
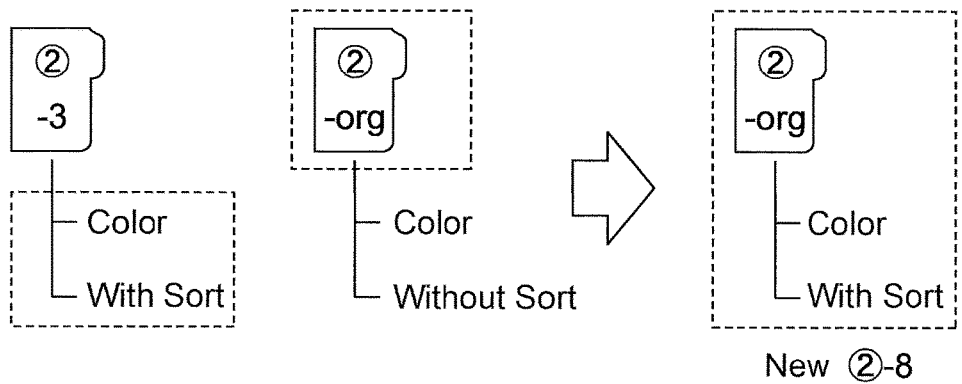
FIG. 6 illustrates a concrete method for achieving replacement of images of a different trial.

FIG. 6 illustrates a concrete method for achieving replacement of images of different trials. The following describes a specific method for achieving the replacement (the replacement of the second page of the set value applied images of the eighth trial with the second page of the set value applied images of the third trial) of the images in FIG. 5. The second page of the set value applied images of the eighth trial is replaced with the identical page (the second page) of the set value applied images of another trial (the third trial). To achieve this, page information of the respective images includes set values as attribute information. Specifically, the second page of the set value applied images of the third trial includes set values (color and with sort) as the attribute information (the drawing on the left in FIG. 6). Even when the set value applied images of a page has been already removed, information on the removal of the second page is recorded in the set value applied images of the eighth trial such that a sum of the number of pages matches sums of the number of pages of the set value applied images of the other trials. On the other hand, (the second page of) the original images (which includes a set value (color and without sort) as the attribute information (the drawing at the center in FIG. 6)) is stored in the image memory 15. The set value applying unit 104 newly generates the second page of the set value applied images of the eighth trial based of the attribute information (color and with sort) of the second page of the set value applied images of the third trial and the second page of the original images to replace the already-removed second page of the set value applied images of the eighth trial. (The drawing on the right in FIG. 6 illustrates reflection of the attribute information of the second page of the set value applied images of the third trial in the second page of the original image.) This means that, in the set value applied images of the eighth trial, only the second page is replaced with the second page of the set value applied images of the third trial.

While at Step S104 the number of copies to be printed is one copy, two or more copies (however, less than the number of print copies) may be printed when the number of print copies is equal to or more than three copies. Furthermore, the number of copies to be printed at Step S104 may be set via the operation unit 17.

4. Summary

According to a typical technique of trial printing, after the number of print copies is set, one copy is printed first. The user visually checks the printing result, and when the user is satisfied with the printing result, the remaining number of copies are printed. On the other hand, when being not satisfied with the printing result, the user enters a set value, and one copy is printed again. After that, when being not satisfied with a printing result again, the user re-enters a set value, and one copy is printed again. Until the user becomes satisfied with the printing result, every time the user re-enters a set value, one copy each is printed. Thus, when a set value is re-entered again and again, as a result, it is not possible to reproduce the previous printing result. This is because the user no longer remembers which set value is the set value at the time and thus it is difficult to enter an identical set value when the printing result of the previous trial is better.

In contrast to this, according to the embodiment, the set value applying unit 104 stores the set value applied images whose number of pieces is the number of trials (YES at Step S105) in the image memory 15 (Step S107). This means that all the set value applied images are stored in the image memory 15, and thus when the user assumes that the printing result of the previous trial is better later, the set value applied images of the trial is selected (Step S108), and then can be printed (Step S109). In other words, it is not necessary to re-enter the set value of the previous trial.

Furthermore, according to the embodiment, the image obtaining unit 101 stores the original images in the image memory 15 (Step S101), and the set value obtaining unit 103 stores the set value in the memory (Step S106). Thus, when the user assumes that a printing result of a part of pages of a certain trial is good while printing results of the other pages of another trial are good, a set value of the certain trial is applied to only the part of pages of the original images and then a set value applied images can be newly remade. Then, the newly remade set value applied images of the part of pages can be replaced with a set value applied images of an identical page of another trial. Thus, when the user thinks that a printing result of a part of pages of a certain trial is good, and printing results of the other pages of another trial are good, a set value of a different trial is selected for each page, and a set value applied images can be generated.

Furthermore, with the embodiment, the set value applied image, which satisfies the user, is generated and easily printed, and this reduces the number of times of trial printing, and leads to the reduced number of paper sheet to be used and reduced cost of paper sheet.

The effects described here are not necessarily limited and may be any one of the effects described in the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
    an image obtaining unit that obtains and stores original images of a plurality of pages;
    a copy number obtaining unit that obtains a first count of print copies;
    a set value obtaining unit that obtains and stores one or more set values that is applied to the original images;
    a set value applying unit that applies each of the one or more set values to the original images obtained by the image obtaining unit to generate and store one or more set value applied images; and
    a print performing unit that prints a specific count of copies of the one or more set value applied images as trial printing, and prints, when one of the one or more set value applied images is selected as a print target, a second count of print copies of the selected one of the one or more set value applied images, the second count of copies being found by subtracting the specific count of copies from the first count of print copies,
    the one or more set value applied images include at least a first set value applied image and a second set value applied image to which a different set value from the first set value applied image is applied,
    the set value obtaining unit obtains a replacement of at least one page of the first set value applied image with an identical page of the second set value applied image, as one of the one or more set values,
    the set value applying unit applies the different set value to the at least one page of the original images obtained by the image obtaining unit to newly generate the identical page of the second set value applied image to which the different set value is applied, and
    the set value applying unit replaces the at least one page of the first set value applied image with the newly generated identical page.

2. The image forming apparatus according to claim 1, wherein the specific count of copies is one copy.

3. The image forming apparatus according to claim 1, wherein the set value obtaining unit obtains removal of at least one page of the set value applied image, as one of the one or more set values.

4. A non-transitory computer-readable recording medium storing a program for controlling a computer of an image forming apparatus, the program causing the computer of the image forming apparatus to operate as:
    an image obtaining unit that obtains and stores original images of a plurality of pages;
    a copy number obtaining unit that obtains a first count of print copies;
    a set value obtaining unit that obtains and stores a set value that is applied to the original images;
    a set value applying unit that applies each of the one or more set values to the original images obtained by the image obtaining unit to generate and store one or more set value applied images; and
    a print performing unit that prints a specific count of copies of the set value applied images as trial printing, and prints, when one of the one or more set value applied images is selected as a print target, a second count of print copies of the selected one of the one or more set value applied images, the second count of copies being found by subtracting the specific count of copies from the first count of print copies
    the one or more set value applied images include at least a first set value applied image and a second set value applied image to which a different set value from the first set value applied image is applied,
    the set value obtaining unit obtains a replacement of at least one page of the first set value applied image with an identical page of the second set value applied image, as one of the one or more set values,
    the set value applying unit applies the different set value to the at least one page of the original images obtained by the image obtaining unit to newly generate the identical page of the second set value applied image to which the different set value is applied, and
    the set value applying unit replaces the at least one page of the first set value applied image with the newly generated identical page.

* * * * *